(12) United States Patent
Koivula

(10) Patent No.: US 7,650,920 B2
(45) Date of Patent: Jan. 26, 2010

(54) METHOD AND ARRANGEMENT FOR INCREASING SAFETY WHEN HANDLING A WHEEL

(75) Inventor: Juha Koivula, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 273 days.

(21) Appl. No.: 11/792,488

(22) PCT Filed: Dec. 8, 2005

(86) PCT No.: PCT/FI2005/050455

§ 371 (c)(1),
(2), (4) Date: Jun. 7, 2007

(87) PCT Pub. No.: WO2006/061465

PCT Pub. Date: Jun. 15, 2006

(65) Prior Publication Data

US 2008/0073015 A1 Mar. 27, 2008

(30) Foreign Application Priority Data

Dec. 8, 2004 (FI) .................................. 20045468

(51) Int. Cl.
*B60C 29/06* (2006.01)
(52) U.S. Cl. ..................................................... 152/427
(58) Field of Classification Search ................ 301/10.1, 301/11.1, 11.2, 14; 152/396–367, 409, 427; 411/87, 90–92, 116, 118–119, 136
See application file for complete search history.

(56) References Cited

U.S. PATENT DOCUMENTS 3,831,658 A * 8/1974 Poplawski ................... 152/427
3,882,919 A * 5/1975 Sons et al. ................... 152/427

FOREIGN PATENT DOCUMENTS

| GB | 2 300 890 A | 11/1996 |
| GB | 2 330 637 | 4/1999 |
| GB | 2 394 265 A | 4/2004 |
| WO | 98/31554 A | 7/1998 |

OTHER PUBLICATIONS

Supplementary European Search Report mailed May 8, 2007 issued in European Application No. 05817673.6.

* cited by examiner

*Primary Examiner*—Jason R Bellinger
(74) *Attorney, Agent, or Firm*—Drinker Biddle & Reath LLP

(57) ABSTRACT

A Method and an arrangement for increasing safety when handling a wheel. The method comprises locking a fastening bolt of the rim in the vicinity of a wheel valve in place with a locking device. The arrangement comprises a locking device which locks at least one fastening bolt in the vicinity of the wheel valve in such a way that the fastening bolt cannot be detached before the locking device is removed.

6 Claims, 3 Drawing Sheets

METHOD AND ARRANGEMENT FOR INCREASING SAFETY WHEN HANDLING A WHEEL

BACKGROUND OF THE INVENTION

The invention relates to a method for increasing safety in the handling of a wheel of a heavy vehicle when the wheel is being detached from the vehicle shaft in such a way that the fastening bolts attaching the wheel rim to the vehicle shaft are detached to detach the rim from the shaft.

Further, the invention relates to an arrangement for increasing safety in the handling of a wheel of a heavy vehicle when the wheel is being detached from the vehicle shaft in such a way that the fastening bolts attaching the wheel rim to the vehicle shaft are detached to detach the rim from the shaft.

In different heavy-vehicle wheels, rims are implemented in such a way that one edge of the rim has a fixed flange and the other edge has a loose flange that is locked in place into a locking groove at that end of the rim with a separate locking ring. The rim, in turn, is attached to the shaft hub in a circular manner with a large number of fastening bolts that divide the stress as evenly as possible between the rim and the shaft hub. In use, however, the material of the rims may yield due to stress, whereby different micro-cracks are generated in the rim. These, in turn, may cause the rim to break due to the support being uneven and the attachment getting loose. This may happen for example when fastening bolts of a tire are being loosened to detach the tire for maintenance, such as changing a tire. Accidents etc. are especially prone to happen in such maintenance actions. In the maintenance of tires, accidents happen when too high air pressure has remained in the tires when fastening bolts are being loosened, which causes at least equipment damages and frequently even losses of human life. Usually, the instruction for such a maintenance action is to let the pressurized air out of the tires before detaching any fastening bolts, which would guarantee safety. Despite strict safety regulations, accidents still happen.

BRIEF DESCRIPTION OF THE INVENTION

An object of this invention is to provide a method and a locking device with which the number of accidents in maintenance and repair work of a wheel, typically a wheel of a heavy earthmoving machine or the like, can be at least reduced.

The method according to the invention is characterized by at least one fastening bolt in the vicinity of a wheel valve being locked in place with a locking device that prevents the fastening bolt from being detached before the locking device has been removed and by the locking device being attached in place with a valve or a locking member connected to the valve in such a way that detaching the locking device becomes possible only after the valve has been removed out of place so that the pressurized air within the wheel can discharge. The arrangement according to the invention is characterized in that the arrangement comprises a locking device that locks at least one fastening bolt in the vicinity of a wheel valve in such a way that the fastening bolt cannot be detached before the locking device has been removed, and that it comprises a locking member connected to the wheel valve, which locking member locks the locking device in place in such a way that detaching the locking device becomes possible only after the valve has been removed out of place so that the pressurized air within the wheel can discharge.

An essential idea of the invention is that the detachment of the fastening bolts adjacent to the tire valves is connected with emptying a tire in such a way that loosening the bolts is prevented by providing a locking device that prevents the bolts from being loosened when the locking device is in place. Further, it is essential that the removal or detachment of the locking device out of place without the tire valve having been removed out of place is not possible. In this way, the detachment of the fastening bolts of the rim is connected with emptying the tire. It is essential to one preferred embodiment of the invention that on top of the fastening bolts adjacent to the valves a locking member is mounted which covers the fastening bolts or prevents the fastening bolts from being rotated, the locking member in turn being attached in place with a flange connected to the valve or with another kind of a locking member in such a way that removing the locking device requires that the valve be removed out of place completely.

An advantage of the invention is that the emptying of the tire must be done completely, because without detachment of the valve the rim cannot be loosened, and thus the tire must always be emptied before the adjacent fastening bolts are loosened.

BRIEF DESCRIPTION OF THE FIGURES

The invention will be explained in more detail in the attached drawings, in which.

DETAILED DESCRIPTION OF THE INVENTION

Figure 1A:
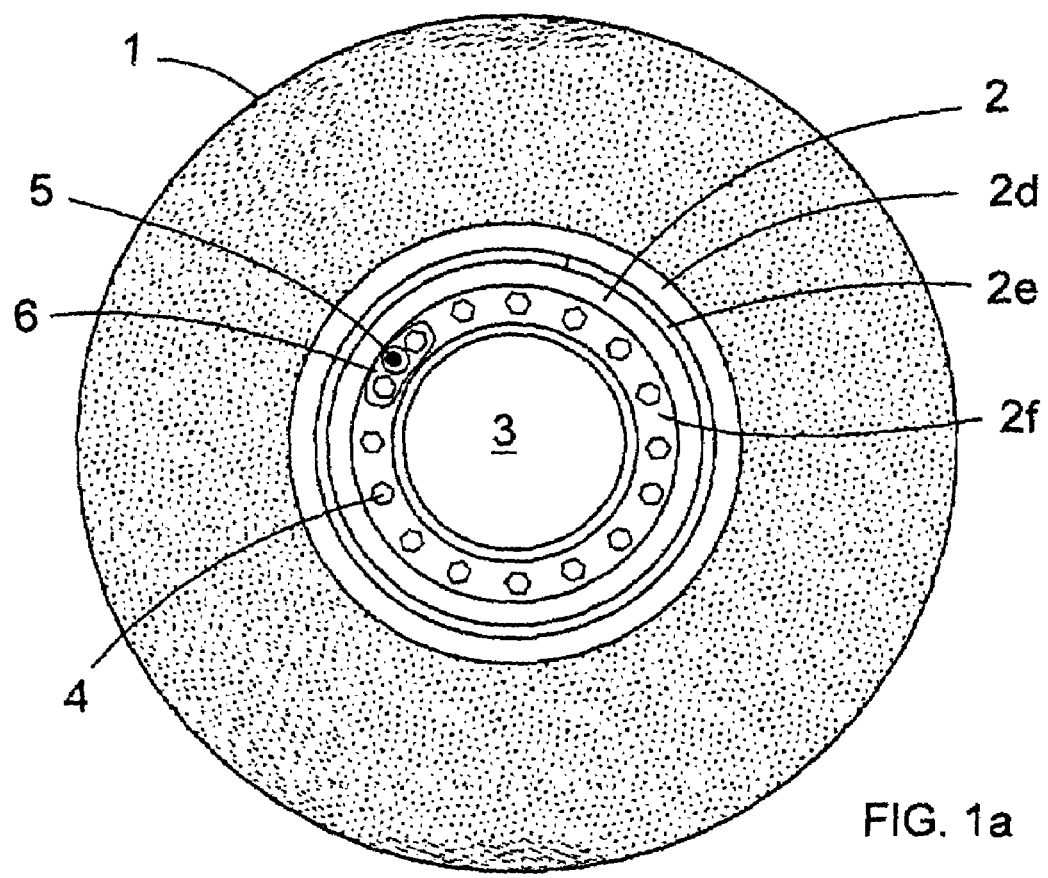
FIGS. 1a and 1b show schematically, from the direction of the shaft and sectioned in its direction, respectively, a vehicle wheel and a rim provided with a locking device according to the invention.
Figure 1B:
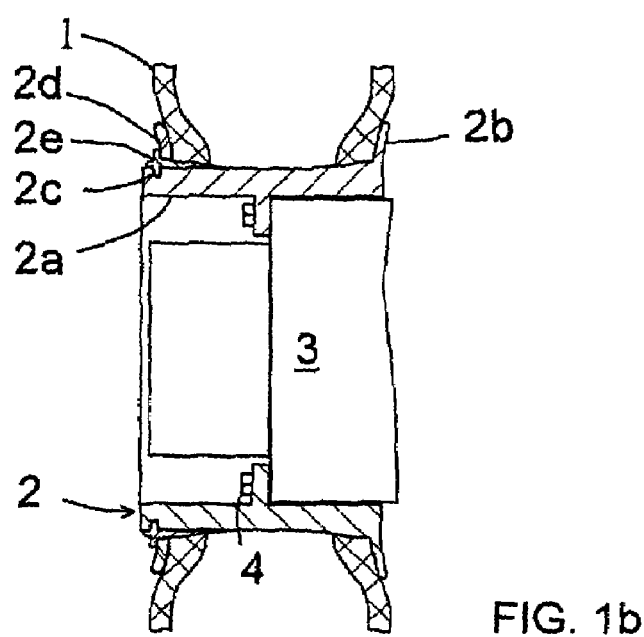

FIGS. 1a and 1b show schematically, from the direction of the shaft and sectioned in its direction, respectively, a vehicle wheel and a rim provided with a locking device according to the invention. In the case of FIG. 1b, a tire 1 is shown only partially at its edges. The tire 1 is mounted on a rim 2 that is typically formed of at least two, usually more parts connectable to each other and correspondingly detachable from each other. The rim 2 comprises a middle part 2a, around which the tire is attached. A first flange part 2b is a fixed part of one edge of the middle part 2a, one edge of the tire 1 being positioned against this first flange part when the tire 1 is in place. Further, the rim 2 has a locking groove 2c at its opposite edge. Between the locking groove 2c and the tire 1, there is typically a second flange part 2d, against the inner surface of which the other edge of the tire 1 becomes positioned when the tire is mounted on the rim. The second flange part 2d is locked in place with a locking rim 2e cut at one point and mounted between the locking groove 2c and the second flange part 2d. When the locking rim 2e is in place, the second flange part 2d cannot move out of place over the locking groove 2c, and thus they keep the tire 1 in place together, even when it is pressurized. The rim 2 is attached to the center 3 of the vehicle shaft with fastening bolts 4 going through the holes of a fastening flange 2f inside the rim 2.

For maintenance actions of the tire, i.e. typically for changing the tire, the rim 2 is detached from the center 3 of the shaft by detaching the fastening bolts 4 with which they are attached to each other. However, due to the risks caused by possible micro-cracks, the tire 1 needs to be emptied first by letting the pressurized air out of it by means of a valve 5. The problem is that sometimes the tire is not allowed to be emptied properly but the detachment of the fastening bolts 4 is started before the pressure has been decreased enough, or the pressure has not been decreased at all. In such cases, the force of the air pressure in the tires may cause the structure of the rim to yield, and thus the rim parts and pieces and possibly the tire 1 or its pieces are thrown around. This, in turn, usually causes injuries for the person performing tire maintenance.

FIG. 1 further shows a locking device 6 according to the invention. The locking device 6 is attached in place by means of a valve 5 or a separate locking part between the valve 5 and the valve frame shown later in FIGS. 4a and 4b, and it prevents the fastening bolts 4a and 4b on both sides of the valve 5, shown in more detail in FIGS. 2a to 3b, from being loosened before the valve 5 or the valve 5 and the separate locking part connected to it as well as the locking device 6 are removed. The essential idea in this matter is that since loosening and detaching certain fastening bolts is not possible before the valve 5 has been removed, the person performing tire maintenance must, in any case, open the valve 5 to be able to loosen all fastening bolts. Thus, he/she must in any case remember to open the valve 5, and as a result, the pressure in the tire will decrease sufficiently before there is any time for removing so many fastening bolts that it would be dangerous in respect of work safety.

Figure 2A:
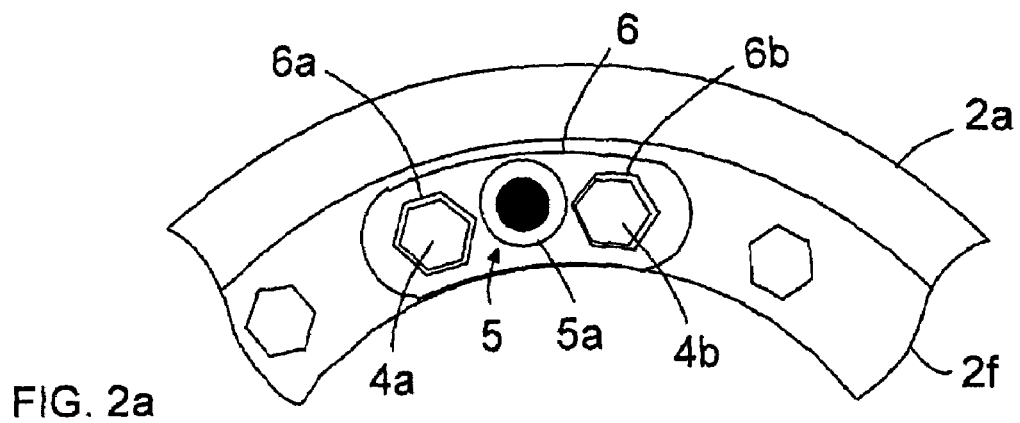
FIGS. 2a and 2b show schematically and in more detail a top view and a side view, respectively, of a locking device according to the invention.
Figure 2B:
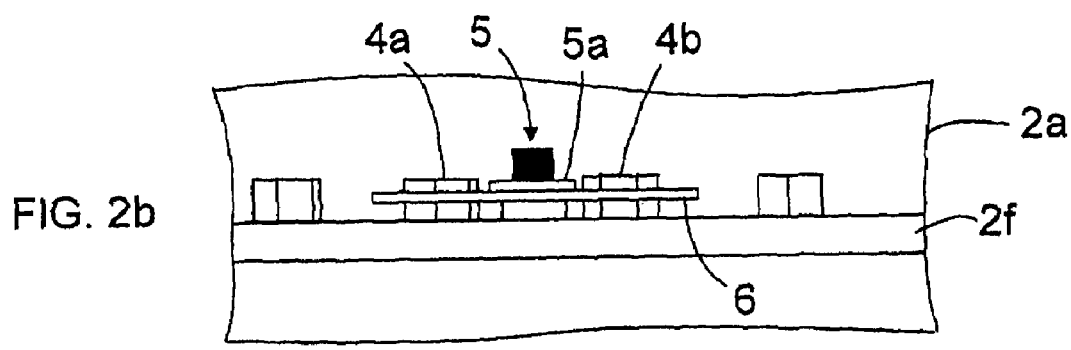

FIGS. 2a and 2b show in greater detail an embodiment of a locking device of the invention in the direction of the shaft and from the middle of the rim outwards, respectively. For the sake of clarity, the rim 2 is shown here only partially. In an exemplary manner, this embodiment comprises in a plate-like locking device 6 openings 6a and 6b of a shape of the heads of the fastening bolts 4, through which openings the heads of the fastening bolts 4a and 4b become positioned. The openings 6a and 6b prevent the fastening bolts 4 from rotating before the locking device 6 is removed. The locking device 6, in turn, comprises an opening through which the valve frame shown in more detail in FIGS. 4a and 4b extends. On the valve frame, a valve 5 is mounted which comprises a flange 5a. The flange 5a is a fixed part of the valve 5, or it is a separate flange-like locking part locked in place by the valve 5, so that it cannot be detached without the valve 5 being rotated out of place. Thus, at the same time, it locks the locking device 6 in place. When the valve 5 has been rotated out of place, the tire is emptied of air, whereby the risk of an accident is eliminated. Correspondingly, after the valve 5 has been removed, the locking device 6 can be removed and the fastening bolts 4a and 4b locked by it can be loosened.

Figure 3A:
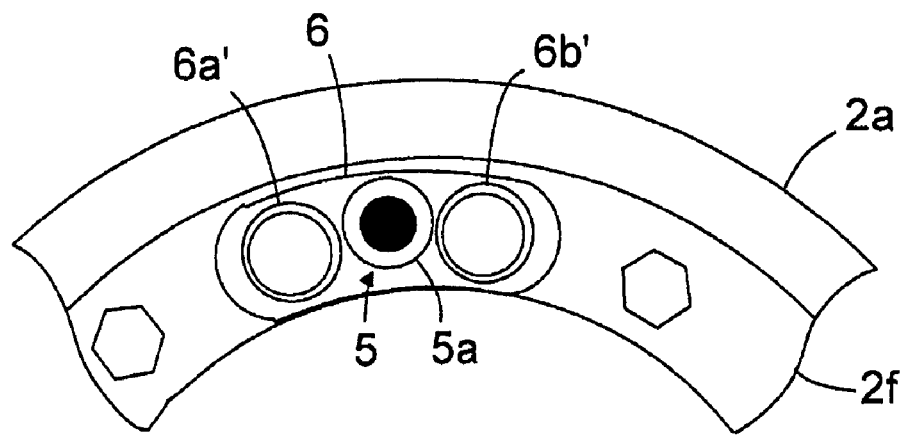
FIGS. 3a and 3b show schematically and in more detail a top view and a side view, respectively, of another locking member according to the invention.
Figure 3B:
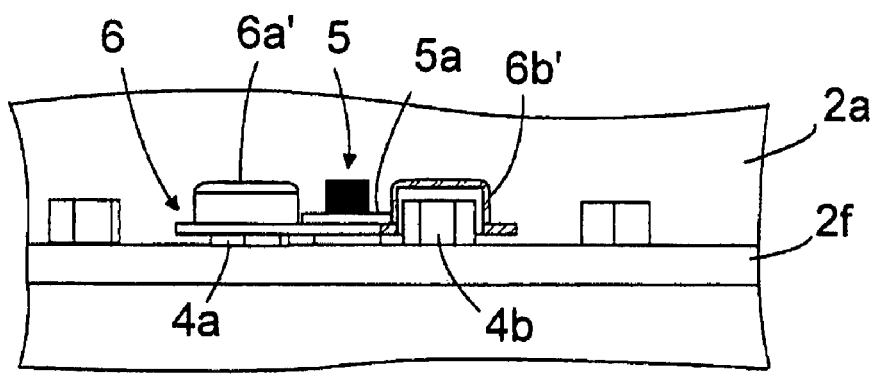

FIGS. 3a and 3b show another, more detailed embodiment of the locking device according to the invention in the direction of the shaft and outwards from the middle of the rim. Also in these figures the rim 2 is shown only partially for the sake of clarity. In this embodiment, the locking device 6 comprises protective covers 6a' and 6b' that cover the ends of the fastening bolts 4a and 4b on both sides of the valve 5 in such a way that they cannot be rotated loose without removing the locking device. For clarity, the second cover 6b' is shown sectioned in FIG. 3b. This embodiment also has in the valve 5 a locking flange 5a, which locks the locking device 6 in place until the valve 5 has been removed out of place so that the tire can be emptied.

Figure 4A:
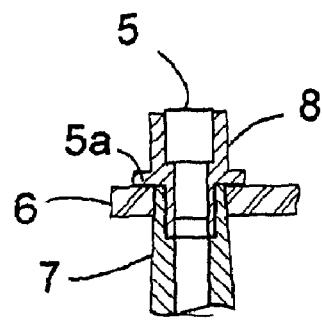
FIGS. 4a and 4b show schematically and in detail the structure of a valve and the locking of the locking device by means of the valve and a locking part connected to it.
Figure 4B:
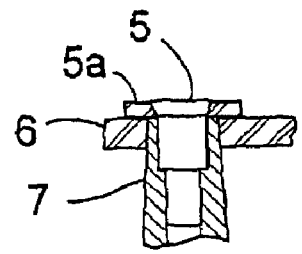

FIGS. 4a and 4b show in more detail a typical valve structure and locking of a locking device in place by means of a valve or a separate locking part connected to it. FIG. 4a shows an embodiment where the locking device 6 has been positioned upon a valve frame 7 known as such in such a way that the valve frame 7 extends through a hole or an opening in the locking device 6. The valve frame 7 is, in a manner known as such, connected to the interior of the wheel and is typically a fixed part of the inner tube of the wheel. The valve frame 7 has threads not shown in more detail, into which the valve 5 is usually screwed when being mounted in place. The valve 5 is shown schematically in the figure, because an ordinary structure of the valve as such is not essential to the invention. The threads of the valve structure 7 are provided with a separate locking part 8 serving as a fastening member and having a flange 5a. The inside of the locking part 8, in turn, correspondingly comprises threads matching with the valve 5, so that screwing the valve 5 in place into the locking part 8 generates a tight joint, in which the valve keeps the air flow out of the wheel interior. In this embodiment, the locking part 8 must be removed in order for the locking device 6 to be detached. At the same time, the valve 5 is detached. Naturally, the pressure inside the tire can be let out by first removing the valve 5, after which the locking part 8 must be removed in order for the locking device 6 to be detached. In both cases, the valve 5 must be removed before the locking device 6 is released. In this embodiment, a standard valve can be used without any changes.

FIG. 4b, in turn, shows an embodiment where the valve 5 is screwed into the locking frame 7 in its normal place. In this embodiment, the flange 5a that locks the locking device 6 in place may either be a separate flange locked in place by means of a conical end in the valve 5 or it may be a fixed part of the valve 5. The locking device 6 comprises protective covers 6a' and 6b' that cover the ends of the bolts 4a and 4b on both sides of the valve 5 in such a way that they cannot be rotated loose without removing the locking device. The protective covers 6a' and 6b' may cover the ends of the fastening bolts 4a and 4b either completely or partly, as far as they prevent the bolts from being loosened. In this embodiment, the valve 5 deviates from a standard valve, due to which the embodiment shown in FIG. 4a is more practical.

When the tire work is started, it is done with a locking device of the invention according to our instruction in such a way that at first the valve 5 or the locking part connected to it is detached, whereby the air present in the tire is let out and the pressure inside the wheel begins to decrease. After the valve has been removed, the locking device 6 can be detached that locks the fastening bolts adjacent to the valve in place. After this, fastening bolts of the tire can be detached safely because there is time for the pressure in the tires to decrease sufficiently before the fastening bolts are loosened, and thus the possible damages caused by micro-cracks do not result in the breaking of the rim.

In the above explanations and drawings, the invention is presented only in an exemplary manner and is by no means restricted to it. What is essential is that the locking device comprises locking elements, such as openings of a shape of fastening bolts or parts covering the ends of the fastening bolt at least partially, which parts prevent the fastening bolts adjacent to the valve from being loosened before the locking device is removed. Further, it is essential that there is a special locking element, such as a flange or a separate locking part including a valve, in the valve or connected to the valve, with which locking elements the locking device is locked in place in such a way that the locking device cannot be removed without the valve being removed out of place.

The invention claimed is:

1. A method for increasing safety in the handling of a wheel of a heavy vehicle when the wheel is being detached from the vehicle shaft in such a way that the fastening bolts attaching the wheel rim to the vehicle shaft are detached to detach the rim from the shaft, whereby at least one fastening bolt in the vicinity of a wheel valve is locked in place with a locking device that prevents the fastening bolt from being detached before the locking device has been removed and which locking device is attached in place with a locking member connected to the valve in such a way that detaching the locking device becomes possible only after the valve has been removed so that the pressurized air within the wheel can discharge, wherein a separate locking part to be screwed into the valve frame being used in the locking member, inside which locking part the valve is mounted, whereby the locking device comprises an opening through which the frame of the valve extends when the locking device is in place, and the locking part comprises a portion that is larger than the frame of the valve and said opening of the locking device in at least one direction, so that the locking device cannot be removed without first detaching the locking part and the valve.

2. A method according to claim 1, wherein the fastening bolts of the rim, adjacent to both sides of the valve, being locked with the locking device.

3. An arrangement for increasing safety in the handling of a wheel of a heavy vehicle when the wheel is being detached from the vehicle shaft in such a way that the fastening bolts attaching the wheel rim to the vehicle shaft are detached to detach the rim from the shaft, which arrangement comprises a locking device that locks at least one fastening bolt in the vicinity of a wheel valve in such a way that the fastening bolt cannot be detached before the locking device has been removed and that it comprises a locking member connected to the wheel valve, which locking member locks the locking device in place in such a way that detaching the locking device becomes possible only after the valve has been removed so that the pressurized air within the wheel can discharge, wherein the locking member comprises a separate locking part to be screwed into the valve frame, inside which locking part the valve is mounted; that the locking device comprises an opening through which the frame of the valve extends when the locking device is in place; and that the locking part comprises a portion that is larger than the frame of the valve and said opening of the locking device in at least one direction, so that the locking device cannot be removed without first detaching the locking part and the valve.

4. An arrangement according to claim 3, wherein the locking device is arranged to lock the fastening bolts adjacent to both sides of the valve, in place.

5. An arrangement according to claim 3, wherein the locking device comprises a cup-like part positioned upon the fastening bolts, which part covers the head of the fastening bolt at least partly, so that the bolt cannot be turned loose.

6. An arrangement according to claim 3, wherein the locking device has an opening of a shape of the heads of the fastening bolts, so that the openings lock the fastening bolts to be unrotatable by the heads of the fastening bolts.

* * * * *